(12) United States Patent
Fuchs et al.

(10) Patent No.: US 11,377,118 B2
(45) Date of Patent: Jul. 5, 2022

(54) METHOD AND APPARATUS FOR COOPERATIVELY COORDINATING FUTURE DRIVING MANEUVERS OF A VEHICLE WITH FOREIGN MANEUVERS OF AT LEAST ONE FOREIGN VEHICLE

(71) Applicants: ROBERT BOSCH GMBH, Stuttgart (DE); CONTINENTAL TEVES AG & CO. OHG, Frankfurt (DE)

(72) Inventors: Hendrik Fuchs, Hildesheim (DE); Florian Wildschütte, Hildesheim (DE); Thomas Michalke, Weil der Stadt (DE); Ignacio Llatser Marti, Hildesheim (DE); Maxim Dolgov, Renningen (DE); Sebastian Strunck, Niedernhausen (DE); Jonas Schönichen, Weiterstadt (DE); Thomas Grotendorst, Eschborn (DE)

(73) Assignees: ROBERT BOSCH GMBH, Stuttgart (DE); CONTINENTAL TEVES AG & CO. OHG, Frankfurt (DE)

( * ) Notice: Subject to any disclaimer, the term of this patent is extended or adjusted under 35 U.S.C. 154(b) by 53 days.

(21) Appl. No.: 17/046,024

(22) PCT Filed: Apr. 18, 2019

(86) PCT No.: PCT/DE2019/100371
§ 371 (c)(1),
(2) Date: Oct. 8, 2020

(87) PCT Pub. No.: WO2019/206378
PCT Pub. Date: Oct. 31, 2019

(65) Prior Publication Data
US 2021/0031800 A1    Feb. 4, 2021

(30) Foreign Application Priority Data
Apr. 24, 2018 (DE) .......................... 102018109885.5

(51) Int. Cl.
*B60W 60/00* (2020.01)
*G08G 1/16* (2006.01)
(Continued)

(52) U.S. Cl.
CPC ......... *B60W 60/0011* (2020.02); *G08G 1/163* (2013.01); *B60W 10/04* (2013.01);
(Continued)

(58) Field of Classification Search
None
See application file for complete search history.

(56) References Cited

U.S. PATENT DOCUMENTS

2010/0114490 A1* 5/2010 Becker .................. G01S 13/865
701/301
2013/0325306 A1 12/2013 Caveney et al.
(Continued)

FOREIGN PATENT DOCUMENTS

DE    102007058538 A1    6/2009
DE    102012011994       12/2013
(Continued)

OTHER PUBLICATIONS

Pascheka, Patrick, Method for a driver assistance system of a vehicle, Dec. 17, 2015, English translation of DE 102014211507 A1 (Year: 2015).*
(Continued)

*Primary Examiner* — James J Lee
*Assistant Examiner* — Matthew L Parulski
(74) *Attorney, Agent, or Firm* — The Marbury Law Group, PLLC (57) ABSTRACT

The present invention relates to a method of cooperatively coordinating future driving maneuvers of a vehicle with fellow maneuvers of at least one fellow vehicle, wherein a fellow data packet is received from the fellow vehicle, in (Continued)

which a fellow trajectory set of a fellow reference trajectory is contained, a trajectory from a trajectory set for the vehicle is selected as a reference trajectory for the vehicle using the fellow reference trajectory, wherein a trajectory which is collision-free towards the fellow reference trajectory is selected, the trajectories of the trajectory set are rated using limit trajectories, and at least one cooperation trajectory is selected from the trajectories of the trajectory set using the reference effort value, wherein a data packet containing the reference trajectory and the cooperation trajectory is transmitted to the fellow vehicle.

16 Claims, 4 Drawing Sheets (51) Int. Cl.
  *B60W 10/04* (2006.01)
  *B60W 10/18* (2012.01)
  *B60W 10/20* (2006.01)
  *G05D 1/02* (2020.01)
(52) U.S. Cl.
  CPC ............ *B60W 10/18* (2013.01); *B60W 10/20* (2013.01); *G05D 1/0214* (2013.01); *G05D 1/0276* (2013.01); *G05D 2201/0213* (2013.01)

(56) References Cited

U.S. PATENT DOCUMENTS

2018/0231974 A1\* 8/2018 Eggert ................. G05D 1/0088
2019/0113353 A1\* 4/2019 Shimizu ............. G01C 21/3484

FOREIGN PATENT DOCUMENTS

| DE | 102014211507 | A1 | 12/2015 |
| DE | 102015221817 | A1 | 5/2017 |
| DE | 102016209330 | | 11/2017 |
| EP | 2441066 | B1 | 11/2016 |
| JP | 2004326149 | A | 11/2004 |
| JP | 2010287109 | A | 12/2010 |

OTHER PUBLICATIONS

International Search Report and Written Opinion—PCT/DE2019/100371—ISA/EPO—dated Aug. 9, 2019, 11 pages.
Intelligent Maneuver Automation—Cooperative Hazard Avoidance in Real-Time, Feb. 22, 2018, 5 pages retrieved from: https://imagine-online.de/home/.
Werling et al., "Optimal trajectories for time-critical street scenarios using discretized terminal manifolds", The International Journal of Robotics Research, Mar. 2012, DOI: 10.1177/0278364911423042, 15 pages.
Düring et al., "Adaptive Cooperative Maneuver Planning Algorithm for Conflict Resolution in Diverse Traffic Situations", International Conference on Connected Vehicles and Expo (ICCVE), 2014, 8 pages.
Japan Patent Office, Notification of Reasons for Refusal issued in Japanese Patent Application No. 2020-558541, and English Translation, dated Feb. 8, 2022 (12 pages).

\* cited by examiner

METHOD AND APPARATUS FOR COOPERATIVELY COORDINATING FUTURE DRIVING MANEUVERS OF A VEHICLE WITH FOREIGN MANEUVERS OF AT LEAST ONE FOREIGN VEHICLE

CROSS-REFERENCE TO RELATED APPLICATIONS

This is a national stage application of PCT/DE2019/100371, filed internationally on Apr. 18, 2019, which claims priority to German Application No. 102018109885.5, filed on Apr. 24, 2018, all of which are incorporated by reference herein in their entireties.

FIELD OF THE INVENTION

The invention relates to a method and a device for a cooperative coordination of future driving maneuvers of a vehicle with fellow maneuvers of at least one fellow vehicle.

BACKGROUND

Via radio, vehicles may exchange messages with one another and with infrastructure installations. For example, a vehicle may detect objects within its detection range and transmit an object message describing the detected objects. Another vehicle may thus include an object detected by the vehicle outside its own detection range in its own calculations. Also, the vehicle may provide a routing message representing its planned route to enable improved route planning for other vehicles.

DE 10 2007 058 538 A1 describes a method of controlling a hazardous situation in traffic.

DE 10 2012 011 994 A1 describes a method of supporting driver assistance and/or safety functionalities of motor vehicles.

DE 10 2015 221 817 A1 describes a method of decentralized coordination of driving maneuvers.

SUMMARY

Against this background, the approach presented here introduces a method of the cooperative coordination of future driving maneuvers of a vehicle with fellow maneuvers of at least one fellow vehicle, a corresponding device, and finally a corresponding computer program product according to the independent claims. Advantageous further developments and improvements of the approach presented here result from the description and are described in the dependent claims.

Advantages of the Invention

Embodiments of the present invention may advantageously enable future driving maneuvers of different vehicles to be coordinated in mutual agreement, so that none of the vehicles has to perform a disproportionately large steering intervention, braking intervention and/or acceleration intervention to enable flowing traffic. A method used for this purpose may be carried out using a device such as a control unit. For the execution of the method, signals, measured values or the like may be used and/or analyzed, which are provided for example by sensors, measuring instruments or similar devices. The method may be carried out fully or partially automated. Human intervention may not be excluded, but may not be necessary.

A method of the cooperative coordination of future driving maneuvers of a vehicle with fellow maneuvers of at least one fellow vehicle is presented, the method comprising the following steps:

Receiving a fellow data packet from the fellow vehicle, wherein the fellow data packet contains a fellow trajectory set consisting of a fellow reference trajectory and, optionally, at least one fellow trajectory for the fellow vehicle, wherein the fellow data packet further contains a fellow reference effort value characterizing the fellow reference trajectory and, optionally, a fellow effort value characterizing the fellow trajectory;

Selecting a trajectory from a trajectory set for the vehicle as a reference trajectory for the vehicle using the fellow reference trajectory and optionally the fellow trajectory, wherein a trajectory of the trajectory set is selected as the reference trajectory which trajectory is collision-free towards the fellow reference trajectory and optionally to the fellow trajectory within a collision horizon;

Rating the reference trajectory and further trajectories of the trajectory set using a lower limit trajectory and an upper limit trajectory, wherein the reference trajectory is assigned a reference effort value and the trajectories are each assigned an effort value, wherein the lower limit trajectory represents a current ideal trajectory for the vehicle with a lowest possible driving effort and defines a lower limit value of an effort value space, and the upper limit trajectory represents a trajectory with a currently maximum acceptable driving effort for cooperation and defines an upper limit value of the effort value space;

Determining a cooperation demand value using the reference effort value, the lower limit value, the upper limit value, the fellow reference effort value and, optionally, the fellow effort value, the cooperation demand value representing whether it makes more sense to improve one's own situation through a cooperation request or to fulfill a cooperation request of a fellow vehicle;

Selecting at least one cooperation trajectory from the trajectories of the trajectory set using the reference effort value and the cooperation demand value, wherein as the cooperation trajectory a trajectory with an effort value between the reference effort value and the upper limit value is selected as the alternative trajectory if the cooperation demand value represents that the fellow vehicle should be offered a cooperation, or wherein as the cooperation trajectory a trajectory with an effort value between the reference effort value and the lower limit value is selected as the demand trajectory, if the cooperation demand value represents that a cooperation should be requested from the fellow vehicle;

Transmitting a data packet to the fellow vehicle, wherein the data packet contains the reference trajectory and the reference effort value associated with the reference trajectory and at least the cooperation trajectory and the effort value associated with the cooperation trajectory.

In other words, a method for the cooperative coordination of future driving maneuvers of a vehicle with fellow maneuvers of at least one fellow vehicle is presented here, the method comprising the following steps:

Receiving a fellow data packet from the fellow vehicle, the fellow data packet containing a fellow trajectory set of at least one fellow reference trajectory for the fellow vehicle, the fellow data packet further containing a fellow reference effort value characterizing the fellow reference trajectory;

Selecting a trajectory from a trajectory set for the vehicle as a reference trajectory for the vehicle using the fellow reference trajectory and, if applicable, the fellow demand trajectory, wherein a trajectory of the trajectory set is selected as the reference trajectory which trajectory is collision-free towards the fellow reference trajectory within a collision horizon and which additionally enables the fellow demand trajectory if the required additional effort is acceptable;

Rating the reference trajectory and further trajectories of the trajectory set using a lower limit trajectory and an upper limit trajectory, wherein the reference trajectory is assigned a reference effort value and the trajectories are each assigned an effort value, wherein the lower limit trajectory represents a current ideal trajectory for the vehicle with a lowest possible driving effort and defines a lower limit value of an effort value space, and the upper limit trajectory represents a trajectory with a currently maximum acceptable driving effort for cooperation and defines an upper limit value of the effort value space;

Determining a cooperation demand value, which indicates whether it makes more sense to improve one's own situation through a cooperation request, or to grant a fellow vehicle a cooperation request;

Selecting at least one cooperation trajectory from the trajectories of the trajectory set using the reference effort value and the cooperation demand value, wherein as cooperation trajectory a trajectory with an effort value between the reference effort value and the upper limit value is selected as alternative trajectory if the cooperation demand value represents that the fellow vehicle should be offered a cooperation, or wherein as the cooperation trajectory a trajectory with an effort value between the reference effort value and the lower limit value is selected as the demand trajectory if the cooperation demand value represents that a cooperation should be requested from the fellow vehicle.

Sending a data packet to the fellow vehicle, wherein the data packet contains the reference trajectory and the reference effort value associated with the reference trajectory and at least the cooperation trajectory and the effort value associated with the cooperation trajectory, wherein the effort value space is normalized to an interval defined by the fact that the effort values of the two limit trajectories are represented by identical values across vehicles.

Ideas concerning embodiments of the present invention may be regarded as being based, among other things, on the thoughts and findings described below.

A driving maneuver of a vehicle may be understood as steering, braking and/or accelerating the vehicle. A drive train of the vehicle may brake the vehicle by a drag torque and accelerate it by a drive torque. A braking system of the vehicle may brake the vehicle by a braking torque. A steering system of the vehicle may steer the vehicle by a steering angle. The driving maneuvers are speed-dependent. For example, a current speed of the vehicle determines a current minimum drivable curve radius. By braking before steering, a smaller curve radius may be driven.

The vehicle may be described as an own vehicle or ego vehicle. In a device of the vehicle, the method described herein may be executed. The vehicle may be controlled at least partially by a driver. For this purpose, the driver may receive driving instructions from the device. The driving maneuvers may also be controlled at least partially by a control unit. The vehicle may also be controlled fully or partially autonomously by the control unit.

A fellow vehicle is another vehicle. The adjective "fellow" is also used in the text to distinguish other terms associated with the fellow vehicle. The fellow vehicle is steered by a fellow driver or a fellow control unit. The method presented here may also be carried out on a fellow device of the fellow vehicle. A fellow maneuver may be understood as a driving maneuver of the fellow vehicle. The approach presented here may also be executed with swapped roles, from the perspective of the fellow vehicle, whereby the terms vehicle and fellow vehicle as well as the associated features are interchanged.

A trajectory describes a condition progression (e.g. position, orientation, speed vectors and acceleration vectors, etc.) over time, over which the vehicle may be controlled using the driving maneuvers. The trajectory is multidimensional, particularly two-dimensional or three-dimensional. The trajectory may also be infinitely dimensional, for example if the condition of the vehicle is represented by a probability distribution. The trajectory may also be defined as a sleeve that encloses the uncertainties of localization. The trajectory may extend along a driving surface to be driven on by the vehicle, for example a road. The trajectory therefore describes where the vehicle is at what time and where it will be in the future. The trajectory is planned at least up to a prediction horizon. For example, the prediction horizon may be determined by a sensor range of the vehicle. The prediction horizon may be speed-dependent. A collision horizon may be less than or equal to the prediction horizon. The collision horizon may also be speed-dependent. Trajectories are rated as collision-free if they run from the vehicle to the collision horizon in such a way that the vehicle and the fellow vehicle each have at least a minimum distance to each other.

A trajectory set combines a group of possible trajectories, which intersect at a common point or start from a common point. The common point may be a current position of the vehicle at the current time. At the common point, the vehicle travels with identical speed and identical direction for all trajectories of a trajectory set. The trajectories of the trajectory set are all at least slightly different. At least one driving maneuver is different for all trajectories of the trajectory set. Different trajectories of the trajectory set may cross each other. Here, a future position may be reached at the same future point in time via different trajectories.

A data packet may be a self-contained message. The data packet may be called a maneuver coordination message. The data packet may be transmitted via a communication interface from the vehicle to fellow vehicles. Vice versa, the fellow vehicles may provide fellow data packets to the vehicle via the communication interface. The data packet or the fellow data packet may contain a single trajectory information of a single trajectory that is pre-planned for the vehicle. Either the vehicle or the fellow vehicle transmits trajectory information of at least two trajectories. In particular, the data packet contains trajectory information of different trajectories of a trajectory set pre-planned for the vehicle. For example, the trajectories may be mapped as a sequence of location coordinates at fixed distances from each other. The distances may be spatial or temporal. In the case of spatial distances, the location coordinates are provided with time stamps. The trajectories may also be mapped parameterized. Here, the trajectory may be described mathematically as a graph. The trajectory may be described in sections.

The data packet contains effort values for each trajectory, wherein an effort value space of the effort values may be normalized to an interval defined by the fact that the effort values of the two limit trajectories are represented by values being identical across vehicles. Thus, the effort values of the trajectories are comparable without having to reproduce a driving effort of the individual driving maneuvers for each trajectory.

The effort value describes the driving effort required to travel one of the trajectories. The driving effort may be different for different vehicles. For example, the driving effort for an agile, light vehicle may be lower than for a large, heavy vehicle on the same trajectory. Constant driving without any changes in speed and direction may be rated with a low driving effort or no driving effort at all. Strong braking may be rated with a higher driving effort than weak braking. Strong acceleration may be rated with a higher driving effort than weak acceleration. A narrow curve radius may be rated with a higher driving effort than a wide curve radius. The effort value combines the driving efforts required along the respective trajectory into a numerical value. A trajectory with extreme driving maneuvers is thus rated with a higher effort value than a trajectory with weakly developed driving maneuvers.

The trajectories may intersect. If the different vehicles reach an intersection point of the trajectories at different times and are at all times at least the minimum distance apart from each other, the trajectories are rated as collision-free. The minimum distance may be larger in the direction of the trajectories than across the trajectories. The minimum distance may be speed-dependent. If the minimum distance is less than the collision horizon, the trajectories are rated as collision-prone.

The reference trajectory may be the trajectory that is actually to be driven by the vehicle. The reference trajectory may be called target trajectory. The reference trajectory is selected under consideration of the fellow reference trajectory. If the required additional effort is acceptable, the reference trajectory is additionally selected under consideration of the fellow trajectory. The reference effort value indicates a driving effort required to drive the reference trajectory. The reference effort value is determined in comparison with the minimum driving effort corresponding to the effort of the lower limit trajectory and the maximum driving effort corresponding to the effort of the upper limit trajectory. The minimum driving effort may be rated with an effort value of minus one. The maximum driving effort may be rated with an effort value of one. The effort values of the trajectories and the reference effort value of the reference trajectory may lie between one and minus one. The trajectories with a higher driving effort than the reference trajectory may have higher effort values than the reference effort value. The trajectories with a lower driving effort than the reference trajectory may have smaller effort values than the reference effort value.

A cooperation trajectory may be an alternative trajectory or a demand trajectory. Whether the cooperation trajectory is an alternative trajectory or a demand trajectory is determined by a ratio of its effort value to the reference effort value. If the effort value is greater than the reference effort value, then the cooperation trajectory is an alternative trajectory. If the effort value is smaller than the reference effort value, then the cooperation trajectory is a demand trajectory.

The currently maximum acceptable additional driving effort for a cooperation grant may be determined by using a cooperation readiness value. The cooperation readiness value may be predefined. For example, a driver of the vehicle may increase the cooperation readiness value if the vehicle should drive more cooperative trajectories. Likewise, the driver may decrease the cooperation readiness value if the vehicle is to drive less cooperative trajectories.

The cooperation readiness value may be determined using the lower limit trajectory and/or the upper limit trajectory and/or the reference trajectory. The cooperation readiness value may be e.g. a factor higher than the lower limit value of the lower limit trajectory and/or the effort value of the reference trajectory.

The data packet may also contain the lower limit trajectory and/or the upper limit trajectory. The fellow data packet may also contain the lower fellow limit trajectory and/or the upper fellow limit trajectory. By transmitting at least one of the limit trajectories, the reference effort value may be put into relation in the fellow vehicle or in the vehicle itself. Thus, the readiness of the vehicle or the fellow vehicle to cooperate may be better estimated.

The fellow reference trajectory may be classified as fellow demand trajectory in the own vehicle if the fellow vehicle is subordinate. In this case, a trajectory being collision-free towards the fellow demand trajectory within a collision horizon may be selected as the reference trajectory. The fellow vehicle is subordinate if it has to give way based on the traffic rules. By changing the classification, there are more possibilities when selecting the own trajectory.

A fellow cooperation readiness value may be determined using the fellow reference effort value and the fellow effort value. The cooperation trajectory may be selected using the fellow cooperation readiness value. For example, the fellow cooperation readiness value may be a calculated mean of the fellow reference effort value and the fellow effort value. The lower the fellow cooperation readiness value, the more cooperative the fellow vehicle is. The higher the fellow cooperation readiness value, the less willing the fellow vehicle is to cooperate. To a very cooperative fellow vehicle, a demand trajectory may be transmitted as a cooperation trajectory, which gives the vehicle more advantages.

The vehicle may select a trajectory as an alternative trajectory that has lower effort values than the upper limit trajectory in order to signal that the vehicle still has cooperation reserves but does not consider it necessary to fully exploit them in the current situation.

A trajectory may be selected as a cooperation trajectory, whose effort value is at least one cooperation amount closer to the upper limit value than the reference effort value. The higher effort value of the cooperation trajectory may be used to signal the readiness to cooperate, because it indicates that a higher driving effort than for the reference trajectory is also acceptable.

The fellow trajectory set may be transformed to a calculation time of the trajectories. Due to a data transfer of the fellow data packet and the data packet as well as a calculation time of the method, the fellow trajectories may show a time offset towards the own trajectories. By means of the temporal transformation, collisions may be distinguished more precisely. The safety distance may be reduced because the future position of the fellow vehicle may be determined more precisely.

The method may e.g. be implemented in software or hardware or in a mixture of software and hardware such as in a control unit.

Furthermore, the approach presented here establishes a device that is configured to perform, control or implement the steps of a variant of the method presented here in appropriate units.

The device may be an electrical device with at least one computing unit for processing signals or data, at least one memory unit for storing signals or data, and at least one interface and/or communication interface for reading in or outputting data embedded in a communication protocol. The computing unit may be, for example, a signal processor, a so-called system ASIC, a microprocessor or a microcontroller for processing sensor signals of the own and/or fellow vehicles and outputting data signals depending on the sensor signals. The memory unit may be for example a flash memory, an EPROM or a magnetic memory unit. The interface may be configured as a sensor interface for reading in the sensor signals from a sensor and/or as an actuator interface for outputting the data signals and/or control signals to an actuator. The communication interface may be configured to read in or output the data wirelessly and/or wired. The interfaces may also be software modules, which are for example present on a microcontroller next to other software modules.

What is also advantageous is a computer program product or computer program with program code, which may be stored on a machine-readable carrier or storage medium such as a semiconductor memory, a hard disk memory or an optical memory and is used to carry out, implement and/or control the steps of the method according to one of the embodiments described above, in particular if the program product or program is executed on a computer or device.

It is pointed out that some of the possible features and advantages of the invention are described herein with respect to different embodiments. A person skilled in the art will recognize that the features of the method and the device may be combined, adapted or exchanged in a suitable manner to arrive at further embodiments of the invention.

BRIEF DESCRIPTION OF THE DRAWINGS

In the following, embodiments of the invention are described with reference to the attached drawings, whereby neither the drawings nor the description are to be interpreted as restricting the invention.

The figures are merely schematic and not to scale. Identical reference signs in the figures indicate identical or similarly acting features.

DETAILED DESCRIPTION

When maneuvers between vehicles are coordinated to increase comfort, efficiency and safety, among other things, this may be called cooperative driving. This is facilitated by the possibility of direct vehicle-to-vehicle communication (V2V) and the increasing automation of vehicles.

In different scenarios, methods of different types of maneuver coordination between vehicles may be performed.

For example, maneuver coordination may be enabled when avoiding obstacles. Therein, the vehicles involved first transmit a number of possible evasion trajectories. A trajectory describes a condition progression over time or a position of the vehicle over time, respectively. It thus codes where the vehicle will be at a future point in time. Trajectories may be represented either non-parametrically, e.g. as a sequence of location points or discrete or continuous distributions over time, or parametrically as a graph dependent on time, e.g. in the form of a polynomial or a clothoid or a flow of a discrete or continuous distribution. In the process, so-called alternative trajectories are transmitted to neighboring vehicles. Subsequently, from the quantity of possible combinations of alternative trajectories, one is selected where an expected damage is minimized or avoided completely. The rating of the combinations also allows for a prioritization of the respective alternative trajectories.

The maneuver coordination may also take place in general road traffic situations. If required, vehicles may transmit information about their current driving behavior as well as their intended driving behavior in the form of a trajectory. Another vehicle checks whether it may enable the intended maneuver of the transmitting vehicle and, as the case may be, acknowledges this implicitly by adjusting its reference trajectory so that the vehicle having transmitted its intended maneuver will be able to perform it.

Another possibility for cooperative maneuver coordination is based on the idea of transferring two trajectories. Therein, a planned trajectory, which describes the currently planned maneuver, and a desired trajectory, which describes a maneuver the vehicle would like to perform, e.g. because it is more efficient than the currently planned one, are transmitted. The planned trajectory differs from the desired trajectory in that planned trajectories of vehicles are always collision-free, whereas a desired trajectory always has a collision with a planned trajectory. If a vehicle now receives as a fellow wish a desired trajectory from another vehicle that collides with its planned trajectory (ego plan), it checks by means of a global cost criterion whether it may realize an alternative maneuver to make the fellow wish possible and acknowledges the cooperation by changing the ego plan so that there is no longer any collision with the fellow wish.

Embodiments of the Invention

Figure 1:
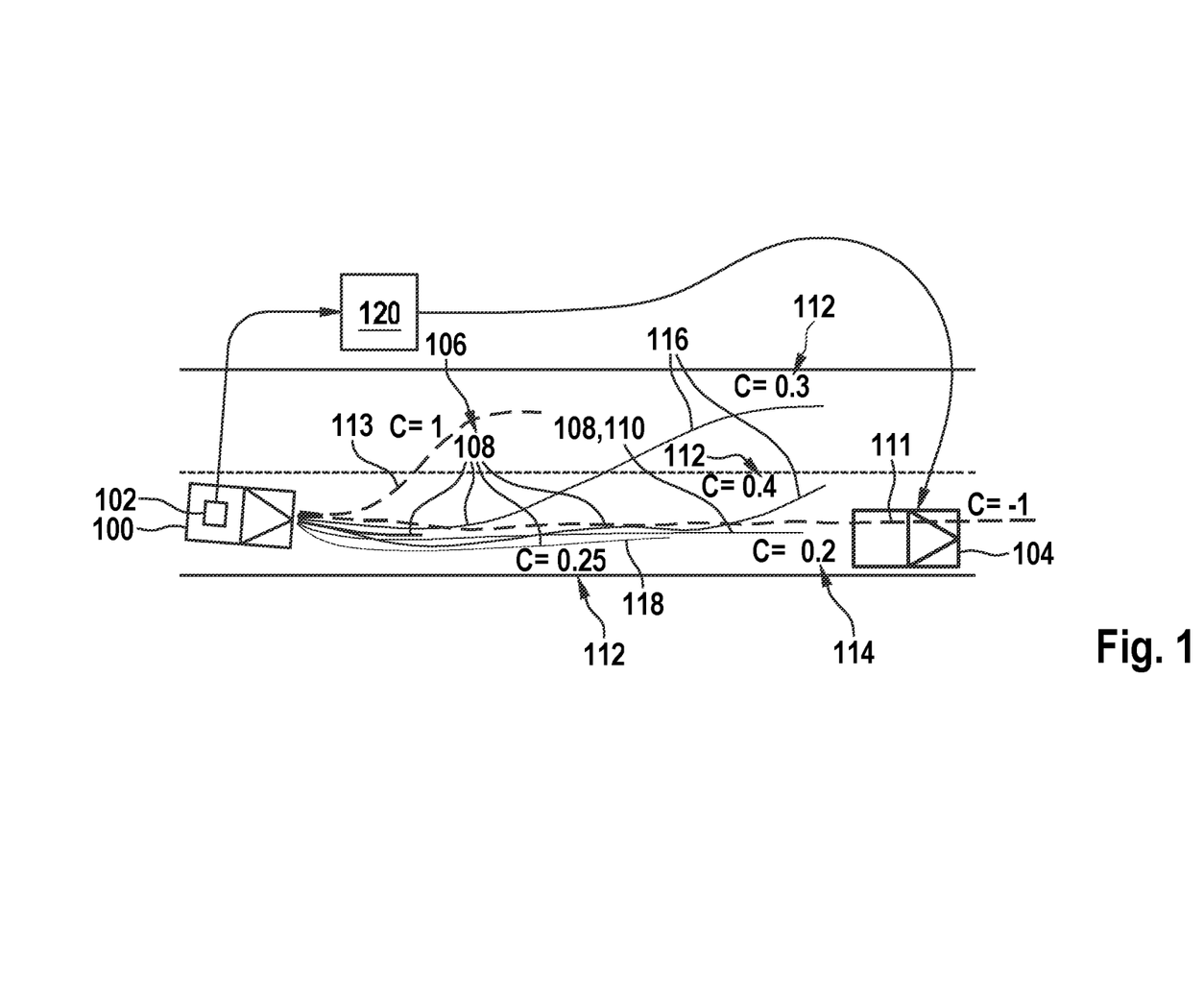
FIG. 1 shows a representation of a vehicle with a device according to an embodiment.

FIG. 1 shows a representation of a vehicle 100 with a device 102 for the cooperative coordination of future driving maneuvers of the vehicle 100 with driving maneuvers of at least one other vehicle 104. Here the vehicle 100 is driving on a road behind the other vehicle 104. The other vehicle 104 may be denominated fellow vehicle 104. Sensors of the vehicle 100 detect a current traffic situation in the vicinity of vehicle 100. Alternatively or in addition, vehicle 100 receives information about the traffic situation via radio. Depending on the traffic situation, a system of the vehicle plans a trajectory set 106 out of currently possible trajectories 108 for the vehicle 100, and one of the trajectories 108 is selected as reference trajectory 110. A trajectory 108 describes a pre-calculated course of location coordinates at which the vehicle 100 would be in the future if it travelled along this trajectory 108 using driving maneuvers such as steering, braking or accelerating. The reference trajectory 110 is actually selected to be driven.

During planning, a lower limit trajectory 111 and an upper limit trajectory 113 are also planned. For the lower limit trajectory 111, all other vehicles 104 are ignored and only static obstacles and road boundaries are considered. So the lower limit trajectory 111 is planned as if the vehicle 100 drove alone on the road. The upper limit trajectory 113 is essentially the opposite of the lower limit trajectory. When planning the upper limit trajectory 113, for example, all necessary driving maneuvers may be planned in order to avoid other road users and give way.

The trajectories 108 all have the same origin. The origin here is at a current position of the vehicle 100. The trajectory set 106 is planned with reference to a prediction horizon. The prediction horizon indicates at which location coordinate the vehicle 100 will be after a period of time. Depending on how the vehicle 100 is accelerated, braked and/or steered, the trajectories 108 have different lengths and end at different location coordinates. For example, a trajectory 108 with maximum deceleration, a trajectory 108 with a lane change, the reference trajectory 110 without steering intervention and braking intervention, a trajectory 108 with an evasive maneuver, and a trajectory 108 with a moderate braking intervention are shown here.

Here, the trajectories 108 of the trajectory set 106 are each evaluated exemplarily with an effort value 112 in the device 102. Therein, the rating is performed in comparison with the two limit trajectories 111, 113. Here, the limit trajectories 111, 113 are assigned the extreme values of an effort value range. The limit values here are minus one and plus one. The lower limit trajectory 111 defines the lower limit value. The upper limit trajectory 113 defines the upper limit value. The more similar a trajectory 108 is to one of the limit trajectories 111, 113, the closer its effort value 112 is to the respective limit value. The reference trajectory 110, too, is thus rated with a reference effort value 114.

Thus the trajectory 108 with the lane change is rated here with an effort value 112 of 0.3. The trajectory 108 with the evasive maneuver is rated with an effort value 112 of 0.4. The reference trajectory 110 is rated with a reference effort value 114 of 0.2, and the trajectory 108 with the moderate brake intervention is rated with an effort value 112 of 0.25.

In an embodiment, trajectories 108 with an effort value 112 greater than the reference effort value 114 are denominated alternative trajectories 116. Trajectories 108 with an effort value less than the reference effort value are denominated demand trajectories 118.

The device 102 sends a data packet 120 to the other vehicle 104. The data packet 120 contains information about the reference trajectory 110, the reference effort value 114 and at least one of the trajectories 108 of the trajectory set 106. The associated effort value 112 is also transmitted via data packet 120.

Figure 2:
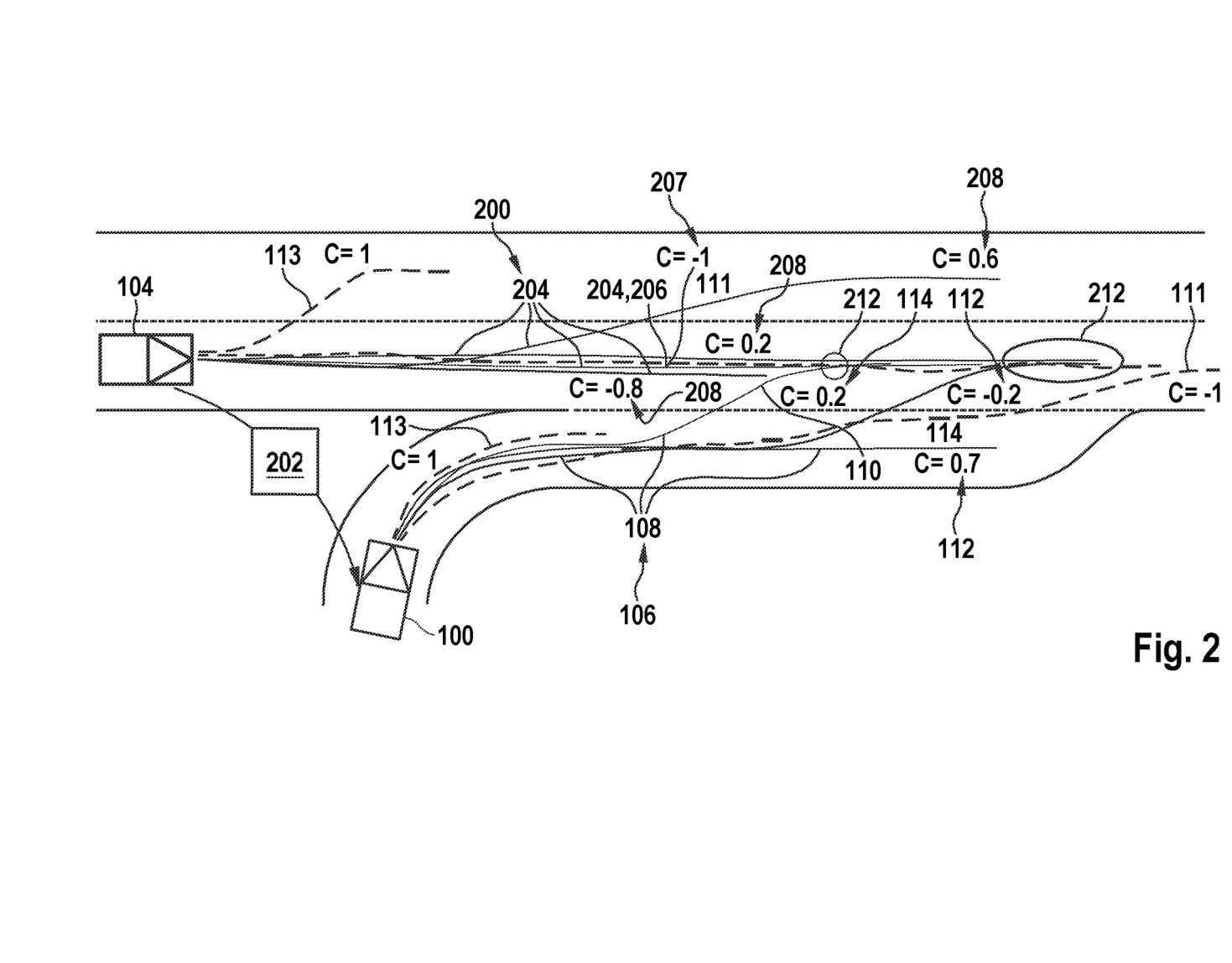
FIG. 2 shows a representation of a vehicle and a fellow vehicle with a trajectory set and a fellow trajectory set.

FIG. 2 shows a representation of a vehicle 100 and a fellow vehicle 104 with a trajectory set 106 and a fellow trajectory set 200. The trajectory set 106 is planned in such a way that the vehicle 100 will drive onto a multi-lane road via an access ramp. The reference trajectory 110 is planned in such a way that vehicle 100 will change to the right-hand lane of the road at about half of an acceleration lane of the access ramp. As other possibilities, trajectories 108 are planned, where the vehicle 100 stays longer on the acceleration lane and changes to the right-hand lane at a later point or brakes on the acceleration lane. As shown in FIG. 1, the reference trajectory 110 and the other trajectories 108 are rated with a reference effort value 114 or an effort value 112 each, respectively, in relation to the upper limit trajectory 113 and the lower limit trajectory 111.

The convenient lane change without strong acceleration is rated with an effort value 112 of −0.2, the moderate deceleration is rated with 0.7. The reference trajectory 110 has a reference effort value 114 of 0.2.

The fellow vehicle 104 is already driving on the right-hand lane of the road. The vehicle 100 receives a fellow data packet 202 from the fellow vehicle 104 with information about the planned fellow trajectory set 200. For the fellow vehicle 104, a fellow trajectory 206 is planned as constant driving on the right-hand lane of the road. On alternative trajectories 204, the fellow vehicle 104 is accelerated or braked on the right-hand lane. On another trajectory 204, a lane change to the left-hand lane is planned. Furthermore, a fellow reference effort value 207 of −1.0, which in this case corresponds to the lower limit trajectory, and fellow effort values 208 for the fellow trajectories 204 are stored in the fellow data packet 202. The lane change is rated with 0.6, the acceleration is rated with 0.2 and the slight braking by applying a drag torque is rated with −0.8. The fellow reference effort value 207 and the fellow effort values 208 are related to a lower limit trajectory 111 and an upper limit trajectory 113 of the fellow vehicle 104.

In vehicle 100, it is recognized that the vehicle 100 requires cooperation because the reference trajectory 110 would lead to a collision 212 with the fellow reference trajectory 206, and the fellow vehicle 104 has right of way. Therefore, the remaining trajectories 108 of the trajectory set 106 are examined for collisions 212. It is further recognized that the vehicle 100 cannot change from the acceleration lane to the road without a collision 212 with the current fellow reference trajectory 206, because the right-hand lane of the road is occupied by the fellow vehicle 104.

On the only collision-free trajectory 108, the vehicle 100 would be braked on the acceleration lane.

Figure 3:
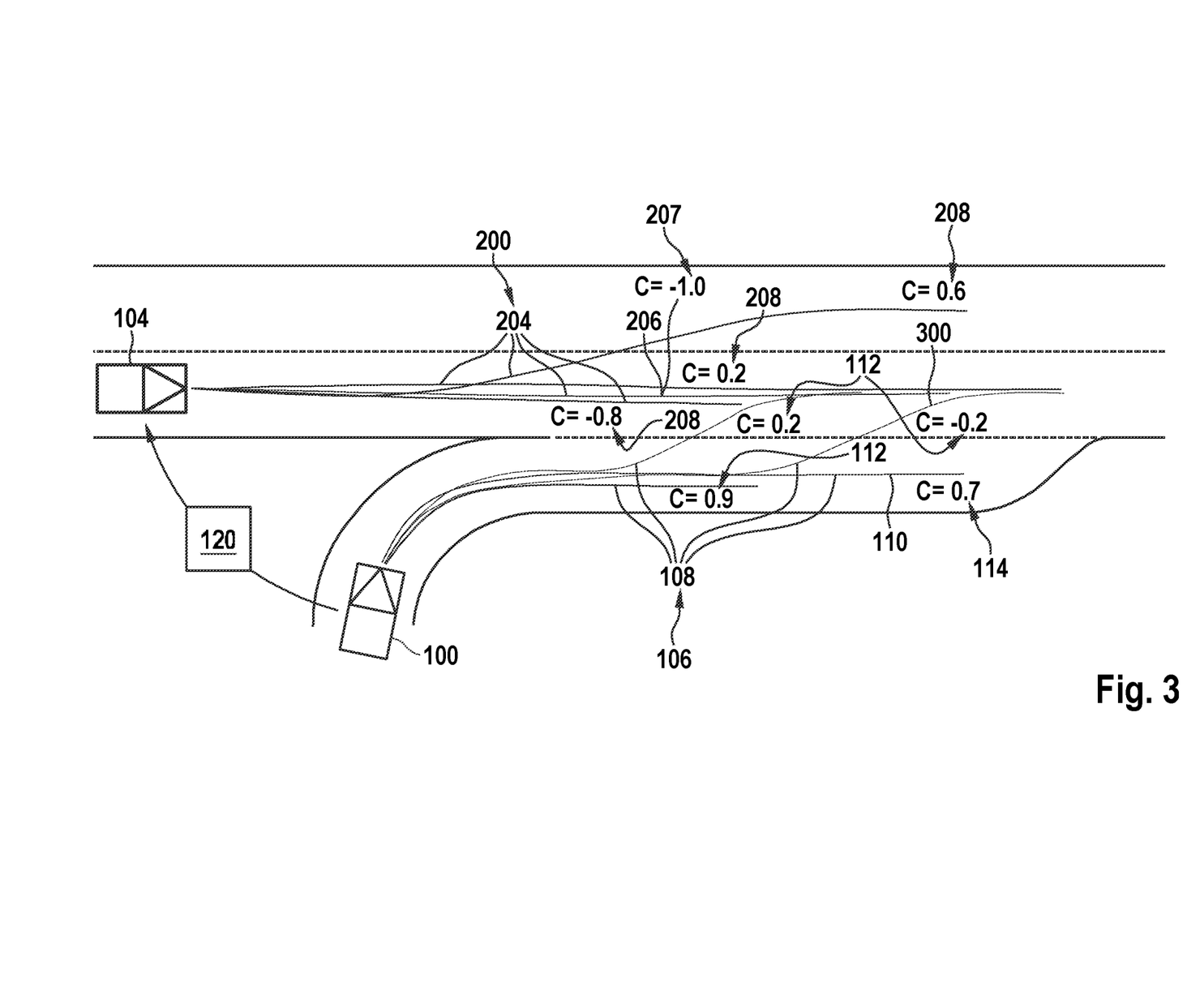
FIG. 3 shows a representation of a vehicle and a fellow vehicle with a trajectory set matched to the fellow trajectory set according to an embodiment.

FIG. 3 shows a representation of a vehicle 100 and a fellow vehicle 104 with a trajectory set 106 matched to the fellow trajectory set 200 according to an embodiment. The representation substantially corresponds to the representation in FIG. 2. Here, the vehicle 100 has selected the only collision-free trajectory 108 from the trajectories 108 as reference trajectory 110. On the new reference trajectory 110, the vehicle 100 is now braked on the acceleration lane to let the fellow vehicle 104 pass on the right-hand lane.

In addition, at least one cooperation trajectory 300 is selected from trajectories 108. The cooperation trajectory 300 is collision-prone towards the fellow reference trajectory 206 but collision-free towards at least one of the other fellow trajectories 204.

The new reference trajectory 110 with the reference effort value 114 and the cooperation trajectory 108 with its associated effort value 112 are transmitted to the fellow vehicle 104 in a data packet 120 as shown in FIG. 1.

In the fellow vehicle 104, the fellow reference trajectory 206 is now also examined for collisions 212. It is recognized that the vehicle 100 requiring cooperation has chosen its reference trajectory 110 collision-free and requests the cooperation trajectory 300 as a possible alternative.

Figure 4:
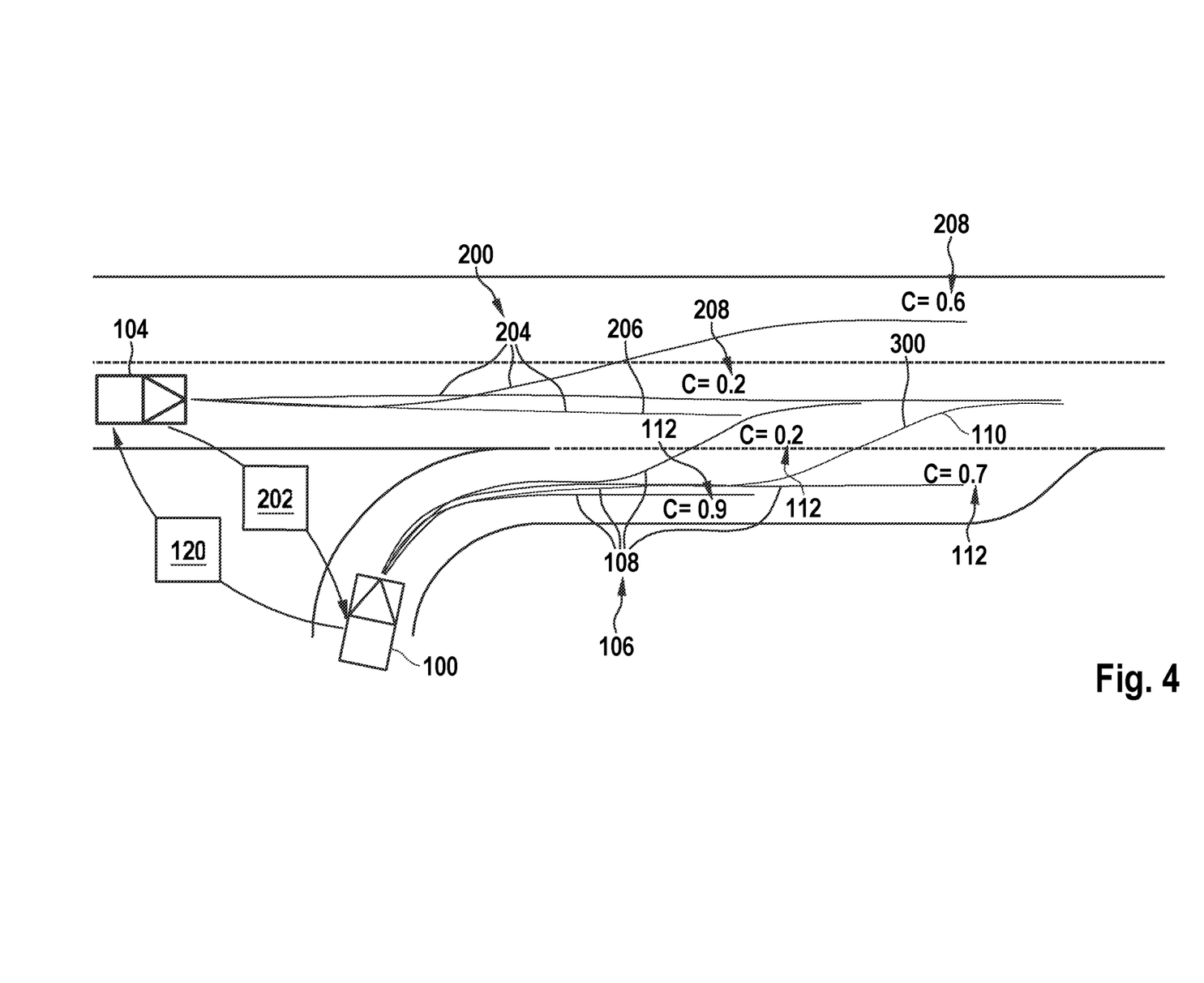
FIG. 4 shows a representation of a vehicle and a fellow vehicle with sets of trajectories matched to each other according to an embodiment.

FIG. 4 shows a representation of a vehicle 100 and a fellow vehicle 104 with trajectory sets 106, 200, which are matched to each other according to an embodiment. The representation substantially corresponds to the representations in FIGS. 2 and 3. Here, the fellow vehicle 104 has reacted to the received reference trajectory 110 as well as the received cooperation trajectory 300 and has in turn selected the fellow trajectory 204 with the slight deceleration as a new fellow reference trajectory 206.

This information is transmitted to the vehicle 100 in a new fellow data packet 202. It recognizes that now the cooperation trajectory 300 is collision-free towards the new fellow reference trajectory 206 and chooses the cooperation trajectory 300 with the late lane change to the right-hand lane as the new reference trajectory 110. This information is again transmitted to the fellow vehicle 104 in a new data packet 120.

In other words, the approach presented here presents a decentralized coordination of cooperative driving maneuvers based on optional trajectories.

The approach presented here describes a method of cooperative maneuver coordination which is based on the exchange of trajectories. Here, information about the currently planned trajectory or reference trajectory and possible trajectories, e.g. for an evasive maneuver (alternative trajectories) or for an intended maneuver (demand trajectories) are transferred with associated effort ratings. This enables the participating vehicles to coordinate an optimal common maneuver (with the lowest total effort). Not always exactly one single desired trajectory is transferred, which increases the number of options in complex scenarios and improves the probability of a mutually profitable cooperation. The decision whether to enable a demand trajectory is not based on a global cost function that makes assumptions about the costs of other vehicles. Thus, for optimal decision making, no cost function that is the same among all vehicle manufacturers is required or else, error-prone assumptions may be dispensed with. Each vehicle calculates its own costs internally and transmits them to the other vehicles in a normalized manner. Reference trajectories do not require an unconditional freedom from collision, since the freedom from collision may also be caused by the fact that the prediction horizons (duration of the projection) of the considered trajectories do not match, for example if one of the cooperation partners uses an extremely short prediction horizon of <1 s. In this case, collisions of reference trajectories will rarely occur. At the other extreme, a very large prediction horizon will always lead to collisions, which would trigger a constant sending of demand trajectories. The "correct" prediction horizon depends on the situation.

With the approach presented here, cooperation does not require an active inquiry. Here, cooperation may be offered, by means of alternative trajectories, by a vehicle, which recognizes the future need for cooperation by another one already in advance, e.g. because it has a much more comprehensive environmental model thanks to its superior sensor technology.

Furthermore, it is possible to negotiate or optimize maneuver coordination. For example, the first vehicle could send a demand trajectory that obliges the second vehicle to reduce speed by 20 km/h if the second vehicle wants to cooperate. In the approach presented here, the second vehicle may communicate that a speed reduction of 10 km/h would be acceptable and it would then be ready to cooperate. Therein, a concrete change of the reference trajectory is not necessary, so that an immediate intervention in the vehicle control may be avoided. Thus, a non-binding continuous negotiation/optimization is achieved.

With the approach presented here, a purely informative transmitting of trajectories takes place. The decentralized cooperative maneuver coordination has two parts. Firstly, a protocol with a set of rules is presented, which allows vehicles to communicate. Secondly, methods are presented to perform different cooperative maneuver coordinations using this protocol. The basic principle is that vehicles exchange a trajectory set or an amount of trajectories or a cluster of trajectories. This amount consists of one "reference trajectory", 0 to n "alternative trajectories" and/or 0 to m "demand trajectories".

A "reference trajectory" is the trajectory that the vehicle currently follows and is implemented as a target parameter by the driving controller/driver. The "reference trajectory" is always communicated. An "alternative trajectory" describes a maneuver that is "more expensive" than the reference trajectory, but that the vehicle would be willing to drive if applicable. The "alternative trajectory" is communicated optionally. A "demand trajectory" describes a desired maneuver that the vehicle would like to drive due to lower "costs", but that the vehicle is currently not able to drive, e.g. because the required maneuver space is occupied by other vehicles. The "demand trajectory" is communicated optionally. The trajectories (reference trajectory, demand trajectory, alternative trajectory) are not explicitly coded by ID or marker. Rather, a cost value or effort value, respectively, is transmitted for each trajectory in addition to the trajectories as such. This makes it possible to set each trajectory in relation to the other trajectories and to derive their meaning and priority therefrom. The transfer of the cost value for each trajectory allows other road users to determine a local approximation of the cost function of the transmitting vehicle. This is especially successful if the cost values and the associated trajectories are rated collectively over time.

The costs may be defined as "cooperation costs". This helps to convey information on how much may be profited from a cooperation, and/or how much additional effort would result from a cooperation grant.

Additionally, it is provided that for each trajectory, optionally a category may be specified. This category is helpful for the consideration of the trajectory in the maneuver planning in the fellow vehicles or other vehicles.

If the vehicle follows an "emergency trajectory", then it is in a technical (e.g. tire blowout) or situation-related emergency (e.g. child runs onto the road), i.e. it will not be able to adhere to normal traffic rules (e.g. stopping on a highway) or represents a potential hazard to other vehicles (due to heavy braking/steering).

A "cooperation offer" represents an offer to other vehicles to enable their demand trajectories. The vehicles concerned may be specified via an additional optional field by means of the V2X IDs of the addressed vehicles.

If a trajectory is marked with the category "Emergency Vehicle", the vehicle on this trajectory has special priority as it is on duty (for the vehicle as such, the information is already included in the CAM (Cooperative Awareness Message).

A category "Proposal" may be used, in conjunction with the field of the V2X ID, to send trajectories as maneuver proposals for specific other vehicles. Herein, a coordination concept is carried out using the cooperation cost values of the trajectories. The cost values of the trajectories are defined here as "cooperation costs". They are determined by the costs of two limit trajectories. The best possible trajectory that may be achieved by cooperation under consideration of the situation is given the value −1, because the vehicle benefits from cooperation, and is denominated as lower limit trajectory. The trajectory which is just acceptable as a concession to make fellow wishes possible under waiver of own costs is defined with the value 1 and is denominated as upper limit trajectory. The other trajectories including the reference trajectory are sorted accordingly. This may be done by setting their costs, which are established by the local cost function, in relation to the two limit trajectories.

The determination of the two limits may be achieved accurately enough if, for the best possible trajectory (=lower limit trajectory), an ego trajectory is determined in an environment where all other vehicles capable of cooperation are neglected, since these vehicles in the best case allow any cooperation wish, ignoring the driving physics. The determination of the upper limit trajectory, which reflects which concessions to enabling the trajectories of others are still acceptable, is less clear. One approach for the determination of the upper limit trajectory is, for example, the definition of a global cost limit. Here, the one trajectory is then selected, whose costs lie e.g. 20% above those of a reference cost value and/or reference effort value. The reference costs may be determined for example from the reference trajectory, or the best possible trajectory, or preferably from a combination of both. The upper cost limit may also be adjusted depending on the maneuver/situation. In the case of manual driving, the cost limit may be learned from the driver behavior in cooperation requests and would then be adaptive.

The exactness of the two limits, respectively their costs, is less important than the basic tendency, respectively the relation among each other. In the process, the sending of the two limit trajectories is not absolutely necessary and may be omitted in favor of other demand/alternative trajectories, which the vehicle assumes will solve a cooperative situation better overall. However, it is important for the concept presented here that each vehicle transmits at least one alternative trajectory as an overall cooperation offer in addition to its reference trajectory. If several maneuvers with similar limit costs are possible (on highways: braking or lane change), it is helpful to transmit an alternative trajectory for each maneuver.

The communicated alternative trajectories may now be used by vehicles requiring cooperation in order to generate an adapted demand trajectory—without having to assess in the own vehicle the situation from the other vehicle's point of view. A vehicle requiring cooperation tries to find a situation that is collision-free and offers the best solution for its own needs out of the possible combinations of received alternative trajectories. This associated trajectory is now transmitted as a demand trajectory. The ego costs of this trajectory relative to the own limit trajectories are used to calculate the value of the cooperation costs. The other vehicles receive the demand trajectory and, since this trajectory refers to their transmitted alternative trajectories, which they have already determined as acceptable, there is a good chance that they accept the cooperation request and adjust their reference trajectories accordingly, whereby in the next step, the original demand trajectory may become a reference trajectory as well.

If vehicles sent their determined upper limit trajectory as an alternative trajectory, the vehicles granting cooperation would incur maximum costs for each cooperation request. Therefore, it is "cooperative", if the needy vehicle sends yet another demand trajectory, which does not represent the best utilization of the situation represented by the alternative trajectories from the viewpoint of the requesting party, but rather accommodates the cooperation-granting party to a certain extent (the "friendly" demand trajectory). Practically, this may be achieved e.g. by the fact that the "party driving up onto a highway" accelerates more strongly than would be necessary.

In other words, from a pool of possible ego trajectories, not the cheapest one is selected, but one that is e.g. 20% more expensive than the cheapest one.

In the opposite case, if fellow vehicles do not send the limit trajectory as alternative trajectories (correspondingly, the cost value is less than 1), by way of trial, a demand trajectory may be transmitted, which is closer to the own lower limit trajectory, e.g. which with regards to costs, lies between the best possible solution and the best solution considering the alternative trajectories. The other vehicles receive the two demand trajectories and enable the most favorable one for them. Herein, they have the possibility to decide how far they want to accommodate the inquirer. The evaluation of the transmitted cooperation costs of the demand trajectories in relation to the transmitted reference trajectory may help in this process.

If a vehicle grants a cooperation request and adjusts its reference trajectory, the value of its transmitted cooperation costs increases because the limit trajectories will remain largely constant. From the progression of this value over time, the other vehicles may read off e.g. how the readiness to cooperate of the sending vehicle changes, and it is e.g. possible to make readjustments during an ongoing cooperation. If the value approaches 1, then the cooperation requesting vehicles should choose trajectories which are more expensive for the own vehicle and which are more accommodating to the cooperation granting vehicle (e.g. more acceleration while filtering in). If the value approaches $-1$, then trajectories may be selected which are more to the advantage of the own vehicle. In addition, the course of the "cooperation costs" of the reference trajectory may show how "cooperative" a vehicle currently is (i.e. whether it makes sense to send a cooperation request to the vehicle). If the value is close to 1 or equal to 1, the vehicle is currently hardly willing to make concessions.

In the vehicle, the method may be carried out in the following steps:

Receiving the maneuver coordination messages of other vehicles (if applicable, a temporal alignment is made, i.e. a transformation to the current time and/or a reassignment of fellow reference trajectories into demand trajectories, if a vehicle is subordinate).

Determining the own reference trajectory, which is collision-free towards other reference trajectories within a collision horizon.

Determining the lower limit trajectory, i.e. the best-case demand trajectory (all cooperative vehicles are ignored), which defines the lower cost limit $C=-1$.

Determining the upper limit trajectory, i.e. the worst-case alternative trajectory as a just acceptable cooperation offer (e.g. with costs 20% above a combination of the costs of reference trajectory and best-case trajectory), which defines the upper cost limit $C=1$.

Optionally, further alternative trajectories may be determined, which do not stress the own cooperation forebearance up to the limit. (e.g. with costs that are only 10% above the costs of a combination of the costs of the reference trajectory and the best-case trajectory).

Own wishes may be introduced by determining the "realistic" demand trajectory (trajectory with the lowest ego costs, which is collision-free towards one of the tuples from other alternative and/or reference trajectories). If one of the considered alternative trajectories has the cooperation costs $C=1$, a trajectory with ego costs 20% higher than the "realistic" trajectory may be determined when determining the "friendly" demand trajectory. If a realistic collision-free solution cannot be found, the best-case trajectory may be transmitted on a trial basis.

To grant cooperation, collision-free tuples may be formed from the reference/alternative/demand trajectories of other vehicles, wherein at least one demand trajectory is included. For each of the above tuples, a most ego-cost-effective own solution may be determined. Altogether, the most ego-cost-effective solution s may be selected. Presumably, the solution for a "friendly demand trajectory" of the other vehicle will win.

A final decision on the implementation of the cooperation grant is made, and if the decision is positive, the reference trajectory is adjusted.

Finally, the reference trajectory, the alternative trajectory/-ies and, if applicable, the demand trajectory/-ies are transmitted.

The concept includes trajectories with one cost value each and a possibility to classify and categorize the trajectories. The trajectories are classified as reference trajectory, demand trajectories and alternative trajectories. The alternative trajectories may be understood as cooperation offers. Reference trajectories may be collision-prone within a defined observation time. After expiration of the observation time, collision freedom is required. Alternative trajectories and demand trajectories are justified even if the reference trajectories of vehicles do not collide.

Thus, the vehicle may preventively/proactively communicate trajectories that it would be willing to drive, since the disadvantages are acceptable within its own cost function. It is possible to negotiate a cooperation before exerting influence on the respective vehicle. This provides the opportunity to efficiently optimize the maneuvers of the vehicles involved in a cooperation. Furthermore, there is the possibility of an extreme reduction of the computational requirements, since preferences of all cooperation partners are explicitly coded and communicated via effort values or costs, with the result that extensive cost analyses for fellow vehicles may be dispensed with. The transferred cost value increases the chance for a successful cooperation, because the costs of the cooperation partner may be estimated more precisely; if applicable, a local estimation of fellow costs may be omitted completely. The costs for one of the received fellow trajectories may also be estimated locally in the vehicle. If applicable, the received cost values of all fellow costs may be normalized. This allows a rough comparison of own and fellow costs with low computational effort. The introduction of categories results in a better support of maneuver planning algorithms.

A method of cooperative maneuver coordination between several vehicles is described, which is based on the periodic or event-based (i.e. when certain conditions are met) exchange of trajectory information between the vehicles. First the transmitted information is described. Then the coordination concept is described in different method variants.

First, rules for transmitting are defined for the different trajectories. The exchanged trajectory information, in the following described as the exchanged trajectory set or trajectory cluster, consists of the reference trajectory of the vehicle, a number M (M>=0) of demand trajectories, a number N (N>=0) of alternative trajectories and a relative cost value C ($-1<=C<=1$) for each transferred trajectory.

The reference trajectory is explicitly indicated, e.g. by the fact that it always comes first in the message. Alternatively or in addition, it may also be identified by an explicit marker. For each trajectory, a special categorization as cooperation offer/emergency trajectory/deployment trajectory/etc. may be transmitted. Each trajectory may be supplemented with a list of V2X IDs of other vehicles which the trajectory refers to with its categorization.

The category "Proposal" may be used to propose trajectories to fellow vehicles which they may then follow, e.g. in special situations such as forming a corridor for emergency vehicle access or avoiding obstacles.

The relative cost values of the trajectories are set as follows. The reference trajectory has a cost value C0 in the interval $-1<C0<1$. The demand trajectories have a cost value $C<C0$. The alternative trajectories have a cost value $C>C0$.

The reference trajectory is the trajectory that the vehicle is currently following and that is the target quantity for the driving controller/driver. Reference trajectories should be free of conflict in principle, but for limited periods of time above a prediction horizon or above a time-to-collision (TTC) threshold, a conflict is possible. If conflicts occur, they are resolved in accordance with the StVO (Road Traffic Regulations). A conflict may be solved by the vehicle that is subordinate according to the StVO. Thus, the preferential vehicle may continue to send its conflicting trajectory.

An alternative trajectory is a trajectory which is of higher cost than the reference trajectory, but which the vehicle would still be willing to drive, if applicable. "If applicable" here means "under reserve", i.e. e.g. a driver's approval may be requested before an alternative trajectory may become the reference trajectory. Additionally, a rating of the overall situation may take place, wherein it is checked whether the own additional costs are offset by sufficient benefits for the other vehicles (from a local perspective). Optionally, the alternative trajectories may be planned in such a way that they do not conflict with all other reference trajectories.

A demand trajectory is a trajectory that better fulfills the desired destination and is therefore more favorable than the reference trajectory. The demand trajectory is in conflict with other trajectories. "Other trajectories" are to be understood as fellow reference trajectories. If these are too short, e.g. due to a different planning horizon, it is sufficient if the conflict occurs with the internal extrapolation of the reference trajectories.

The exchanged trajectories of a cluster of trajectories are not exclusively conceived as trajectories in Euclidean space, but may also be trajectories in other possible spaces. An example is the Frenet space along the lane centers, where a trajectory may consist of the indication of the respective lane as well as of the sections on the lane center over time. In this way, the cluster of trajectories may be efficiently transferred in a structured traffic space (=e.g. highway with lane markings).

In an embodiment, the vehicles involved use the messages on their environment, such as ego state or sensor information, exchanged independently of the cooperation. In this way, the trajectories of other road users may be additionally plausibilised, for example by classifying situations more clearly with the help of fellow sensor data.

For example, a vehicle that recognizes from its situation analysis that another car will, for example, drive up to the highway and will then need to cooperate, may already proactively offer cooperation. It does this by generating a suitable alternative trajectory and sending it (optionally also setting the category "cooperation offer"). The driving-up vehicle may then immediately generate and transmit a suitable demand trajectory. Thereupon, the vehicle on the main lane will adjust its reference trajectory. The more computationally efficient concept described here is based on the fact that vehicles permanently offer cooperation (to a greater or lesser extent).

In certain situations, it may be helpful to send trajectories as proposals to other vehicles. For example in the case of an emergency vehicle that wants a corridor for emergency vehicle access to be formed on the highway. Such suggestions may be useful for manually driven vehicles as a hint to the driver. Another possible use may occur in the case of a sudden emergency situation (avoiding an unexpected obstacle), if there is little time for coordination. Proposals may also be helpful in situations that are ambiguous, such as many vehicles simultaneously at a right-before-left crossroads. For this purpose, a vehicle calculates trajectories for other vehicles, marks them as "Proposal" and provides them with the V2X ID of the addressed vehicles. The proposal trajectories are attached to the maneuver cooperation message and transmitted. The cost values of the proposal trajectories are irrelevant in this case. The other vehicles receive the message and see that it contains a proposal for them. Within the scope of their usual trajectory determination, they evaluate the proposal for plausibility and give it preferential consideration if applicable. The advantage is that if there are possible alternative internal solutions, they will be proposed a variant that has been coordinated by a central location. The method described here thus enables central maneuver coordination.

With the approach presented here, an efficient optimization of cooperative maneuvers may be achieved. Instead of only one demand trajectory or only one alternative trajectory, each vehicle sends several variants of these trajectories. By means of the communicated cooperation costs, other vehicles are made aware of the preferences. A receiving vehicle may now directly select its preferred solution. In addition, it may in turn further determine and send a number of demand trajectories or alternative trajectories around its own solution.

Additional information regarding the technical background to the approach presented here may be found in the following sources:

Projekt IMAGinE—Intelligente ManOver Automatisierung—kooperative Gefahrenvermeidung in Echtzeit.

Werling et al., "Optimal trajectories for time-critical street scenarios using discretized terminal manifolds", The International Journal of Robotics Research, 2011.

During et al., "Adaptive Cooperative Maneuver Planning Algorithm for Conflict Resolution in Diverse Traffic Situations", International Conference on Connected Vehicles and Expo, 2014.

DE10 2016 209 330 A1.

DE10 2012 011 994 A1.

Finally, it should be noted that terms such as "having", "comprising", etc. do not exclude other elements or steps, and terms such as "a" or "one" do not exclude a multitude. Reference numerals in the claims are not to be considered as a limitation.

The invention claimed is:

1. A method performed by a processor of a vehicle for automated cooperatively coordinating future driving maneuvers of the vehicle with fellow maneuvers of at least one fellow vehicle, the method comprising the following steps:

receiving a fellow data packet from the fellow vehicle, wherein the fellow data packet contains a fellow trajectory set of a fellow reference trajectory, wherein the fellow data packet further contains a fellow reference effort value characterizing the fellow reference trajectory;

selecting a trajectory from a trajectory set for the vehicle as a reference trajectory for the vehicle using the fellow reference trajectory, wherein a trajectory of the trajectory set is selected as the reference trajectory which trajectory is collision-free towards the fellow reference trajectory within a collision horizon;

controlling the vehicle using the reference trajectory;

rating the reference trajectory and further trajectories of the trajectory set using a lower limit trajectory and an upper limit trajectory, wherein the reference trajectory is assigned a reference effort value and the trajectories are each assigned an effort value, wherein the lower limit trajectory represents a current ideal trajectory for the vehicle with a lowest possible driving effort and defines a lower limit value of an effort value space, and the upper limit trajectory represents a trajectory with a currently maximum acceptable driving effort for cooperation and defines an upper limit value of the effort value space;

determining a cooperation demand value using the reference effort value, the lower limit value, the upper limit value, and the fellow reference effort value, wherein the cooperation demand value represents whether it makes more sense to improve one's own situation through a cooperation request or to grant a cooperation request to a fellow vehicle;

selecting at least one cooperation trajectory from the trajectories of the trajectory set using the reference effort value and the cooperation demand value, wherein as a cooperation trajectory, a trajectory with an effort value between the reference effort value and the upper limit value is selected as an alternative trajectory if the cooperation demand value represents that a cooperation is to be offered to the fellow vehicle, or wherein as the cooperation trajectory, a trajectory with an effort value between the reference effort value and the lower limit value is selected as a demand trajectory if the cooperation demand value represents that a cooperation is to be requested from the fellow vehicle; and transmitting a data packet to the fellow vehicle, wherein the data packet contains the reference trajectory and the reference effort value associated with the reference trajectory, as well as at least the cooperation trajectory and the effort value associated with the cooperation trajectory.

2. The method according to claim 1, wherein in the step of rating, the currently maximum acceptable driving effort is determined using a reference effort value.

3. The method according to claim 2, wherein the reference effort value is determined using at least one of the lower limit trajectory and the reference trajectory.

4. The method according to claim 1, wherein in the step of transmitting, the data packet further contains at least one of the lower limit trajectory and the upper limit trajectory.

5. The method according to claim 1, wherein in the step of receiving, the fellow reference trajectory is classified as a fellow demand trajectory if the fellow vehicle is subordinate, whereby the fellow vehicle is then no longer taken into account for the selection of the trajectory, which is collision-free within the collision horizon, as the reference trajectory.

6. The method according to claim 1, wherein in the step of receiving, a fellow cooperation readiness value is determined using the fellow reference effort value and the fellow effort value, wherein in the step of selecting, the cooperation trajectory is further selected using the fellow cooperation readiness value.

7. The method according to claim 1, wherein in the step of selecting, a trajectory is selected as the cooperation trajectory whose effort value is closer to the upper limit value than the reference effort value by at least a cooperation amount.

8. The method according to claim 1, wherein in the step of receiving, the fellow trajectory set is transformed to a calculation time of the trajectories.

9. A device, wherein the device is adapted to at least one of execute, implement and control the method according to claim 1 in corresponding units.

10. A computer program product adapted to at least one of execute, implement and control the method according to claim 1.

11. A machine-readable storage medium on which the computer program product according to claim 10 is stored.

12. The method according to claim 1, wherein in the step of receiving the fellow data packet from the fellow vehicle, the fellow data packet additionally contains at least one fellow trajectory for the fellow vehicle.

13. The method according to claim 1, wherein in the step of receiving the fellow data packet from the fellow vehicle, the fellow data packet further contains a fellow effort value characterizing the fellow trajectory.

14. The method according to claim 1, wherein the step of selecting the trajectory from a trajectory set for the vehicle as a reference trajectory for the vehicle using the fellow reference trajectory further comprises selecting the fellow trajectory.

15. The method according to claim 1, wherein, in the step of selecting a trajectory from a trajectory set for the vehicle as a reference trajectory for the vehicle using the fellow reference trajectory, a trajectory of the trajectory set is selected as the reference trajectory, which trajectory is collision-free towards the fellow reference trajectory and to the fellow trajectory within a collision horizon.

16. The method according to claim 1, wherein the step of determining the cooperation demand value using the reference effort value, the lower limit value, the upper limit value and the fellow reference effort value further comprises determining the fellow effort value.

\* \* \* \* \*